United States Patent [19]
Takenaka et al.

[11] 4,334,169
[45] Jun. 8, 1982

[54] ELECTRON GUN STRUCTURE

[75] Inventors: Shigeo Takenaka, Fukaya; Eizaburou Hamano, Kumagaya; Shinpei Koshigoe, Fukaya, all of Japan

[73] Assignee: Tokyo Shibaura Denki Kabushiki Kaisha, Kawasaki, Japan

[21] Appl. No.: 85,678

[22] Filed: Oct. 17, 1979

[51] Int. Cl.³ .................. H01J 29/56; H01J 29/46
[52] U.S. Cl. ............................. 313/414; 313/449; 315/15
[58] Field of Search ........... 313/413, 409, 412, 414, 313/449, 460; 315/14, 15, 16

[56] References Cited

U.S. PATENT DOCUMENTS

2,957,106 10/1960 Moodey ........................ 313/414
3,772,554 11/1973 Hughes ........................ 313/412
4,124,810 11/1978 Bortfeld et al. ................ 313/414

Primary Examiner—Ernest F. Karlsen
Attorney, Agent, or Firm—Schuyler, Banner, Birch, McKie & Beckett

[57] ABSTRACT

An electron gun comprises cathodes for emitting three electron beams, and grid electrodes forming at least two asymmetric electrostatic lenses along three electron gun axes. The lenses focus and deflect the electron beams to converge on a color cathode ray tube screen. The first asymmetric lens, in response to the focus voltage being varied, deflects the beam at a first angle and the second asymmetric lens deflects the beam at a second angle to compensate for the first angle deflection caused by the first asymmetric lens.

9 Claims, 8 Drawing Figures

ELECTRON GUN STRUCTURE

BACKGROUND OF THE INVENTION

This invention relates to an electron gun structure having a plurality of electron lenses along the electron beam path.

Figure 1:
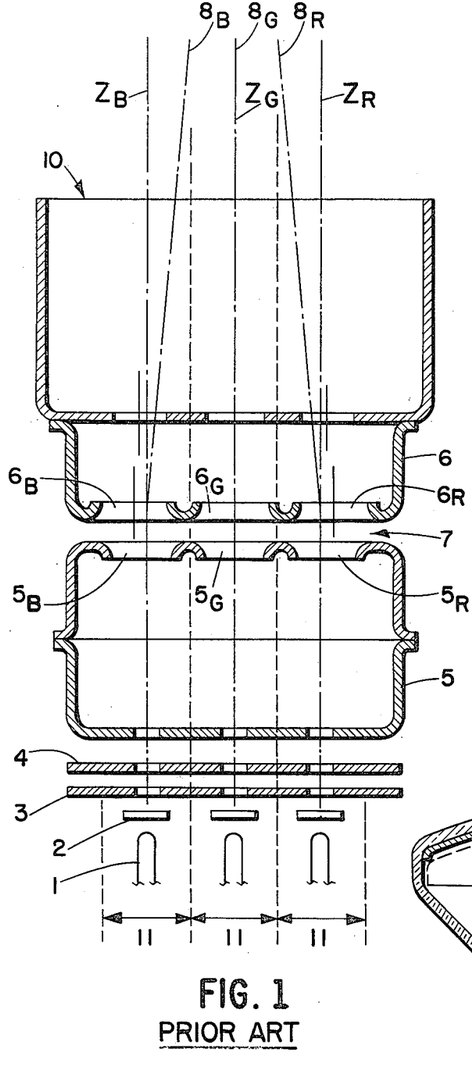
FIG. 1 is an enlarged axial sectional view of a conventional electron gun.

A color cathode ray tube is provided with an electron gun for generating three electron beams which excite three respective color phosphors on a screen. A well known electron gun structure is an in-line type which generates three parallel electron beams within a plane. Each of the electron gun units of this structure is contained within a united body. FIG. 1 of the accompanying drawing shows one example of an in-line type gun widely used in color cathode ray tubes. The electron gun structure 10 includes three electron units 11, each comprising a cathode 2 including filament 1, a first grid electrode 3, a second grid electrode 4, a third grid electrode 5, and a fourth grid electrode 6. All of the grid electrodes are common to the gun units, for example, the first grid electrode 3 is common to gun units 11. A main electrostatic lens 7 is formed, respectively, in each electrode gun unit 11 between the third grid electrode 5 and the fourth grid electrode 6. The third grid electrode 5 is a can-type electrode consisting of two cup-shaped metal members joined together at their open ends. Each surface of electrode 5 comprises three openings; a center electron gun axis $Z_G$ is aligned with the center opening, while side electron gun axes $Z_B$ and $Z_R$ are aligned with the respective side openings. Reference numerals $5_B$, $5_R$ and $5_G$ designate the three openings of electrode 5 which face fourth grid electrode 6. Grid electrode 6 is made of a cup-shaped metal member having three axial openings $6_B$, $6_G$, and $6_R$. The center of opening $6_G$ coincides with the center electron gun axis $Z_G$, while the center of both side openings $6_B$ and $6_R$ are offset from the respective side electron gun axes $Z_B$ and $Z_R$.

As well known, the three electron beams generated must converge for proper color purity. In some prior art devices, this convergence may be obtained by inwardly tilting both side electron gun axes. However, tilting of the side electron gun axes results in imprecision of the gun assembly. Consequently, the structure of FIG. 1 relies upon another prior art method for convergence. Namely, the center electron beam 8 follows a straight path, coincident with the electron gun axis $Z_G$ through opening $5_G$ of the third grid electrode and opening $6_G$ of the fourth grid electrode. On the other hand, each side electron beam $8_B$ and $8_R$ will deflect or bend inwardly toward the center of the screen since the respective center of openings $6_B$ and $6_R$ are offset from the electron gun axes $Z_B$ and $Z_R$, respectively. For example, the amount of offset utilized is about 0.15 mm. When one grid electrode is offset or disposed at an angle to the other grid electrode, the electron field formed therebetween is asymmetrical. An electron beam passing through such asymmetrical field will bend. The amount of deflection of the electron beam resulting from the offset or angle design depends critically on the amount of offset or angle, respectively, and the potential difference between the grid electrodes.

The amount or angle $\theta$ of deflection of the electron by an asymmetrical electron lens is expressed by equation (1), where k is constant, p is the amount of offset normalized by the electrostatic lens diameter, and q is a potential ratio of the electrostatic lens.

$$\theta = (k)(p)(q) \qquad (1)$$

Since the amount of deflection is proportional to q, if the potential across grid electrodes q is not optimum, the electron beams will diverge rather than converge. Moreover, varying the grid voltage to set the optimum value for convergence will also affect focusing. In fact, setting the grid voltage for proper convergence will not necessarily produce proper focusing and vice versa. Consequently, the prior art has required the adjustment of the permanent magnets, attached to the outside of the tube, to partly aid in optimizing both convergence and focusing. For example, pre-set-type color cathode ray tubes have been developed in recent years in which the convergence and focus are set before the tube is attached to a TV set. Frequently, when the tube is attached to the TV set, the electron gun operating voltage is not correct for proper focusing and convengence, and readjustment is necessary. Such readjustment of the tube requires varying both the grid voltage and the position of the permanent magnets; these adjustments are very critical and time consuming.

Another prior art color cathode ray tube comprises an electron gun surrounded by a permanent magnet member within the tube. The magnet member is magnetized from the outside of the tube to converge three electron beams on the center of the screen. Readjustment of this structure, however, is virtually impossible after the tube is attached to the TV set.

Therefore, the electron guns of the prior art have the disadvantage of requiring critical and time consuming readjustment when the tube is attached to the TV set to provide proper focusing and convergence.

SUMMARY OF THE INVENTION

An object of this invention is to overcome the disadvantages of the prior art electron guns including the necessity for critical and time consuming readjustment.

It is a further object of this invention to provide an electron gun system for a color cathode ray tube for converging three electron beams despite a variation in the focus electrode voltage.

Another object of this invention is to provide an electron gun system which, in response to controlling the focus electrode voltage, deflects the electron beam at one angle to compensate for the deflection of the beam at another angle.

In accordance with one aspect of this invention, an electron gun system is provided with a cathode means positioned on an electron gun axis for emitting an electron beam along a beam path. A plurality of grid electrodes are arranged along the electron gun axis. A first voltage source is coupled to at least one of the electrodes for forming a plurality of electrostatic lenses on the electron gun axis for focusing the electron beam. A focus control means is coupled to the first voltage source for controlling the focusing. At least three of the grid electrodes comprise asymmetric deflecting means for forming at least two asymmetric electrostatic lenses along the electron gun axis for deflecting and focusing the electron bean.

DETAILED DESCRIPTION OF THE PREFERRED EMBODIMENT

Figure 2:
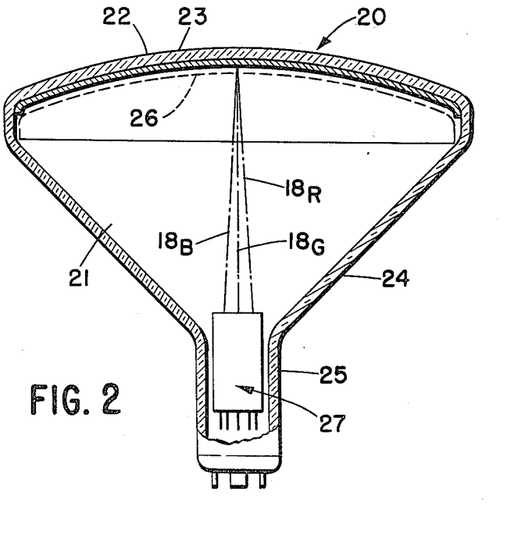
FIG. 2 is an axial sectional view of a shadow mask type color cathode ray tube utilizing an electron gun according to this invention.

Referring to FIG. 2, a color cathode ray tube 20 is provided with an evacuated envelope 21. The envelope 21 comprises a panel 22 of transparent glass on which a phosphor screen 23 is coated, a funnel portion 24 is attached to panel 22 and a neck portion 25 which extends backward from the funnel portion 24. Positioned within the envelope near screen 23 is a shadow mask 26 and an electron gun 27, according to this invention, is mounted inside of neck portion 25.

Figure 3:
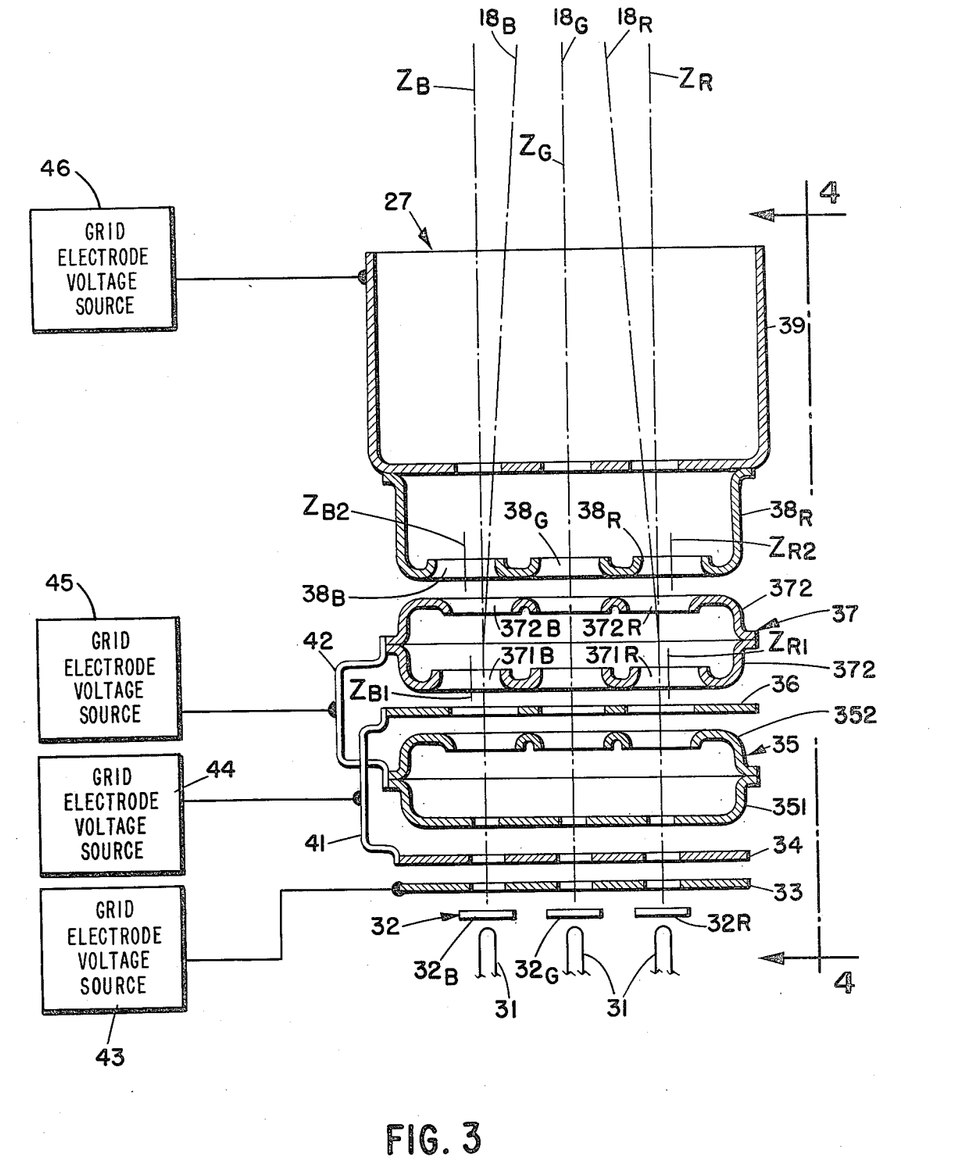
FIG. 3 is an enlarged axial sectional view of an electron gun according to this invention.
Figure 4:
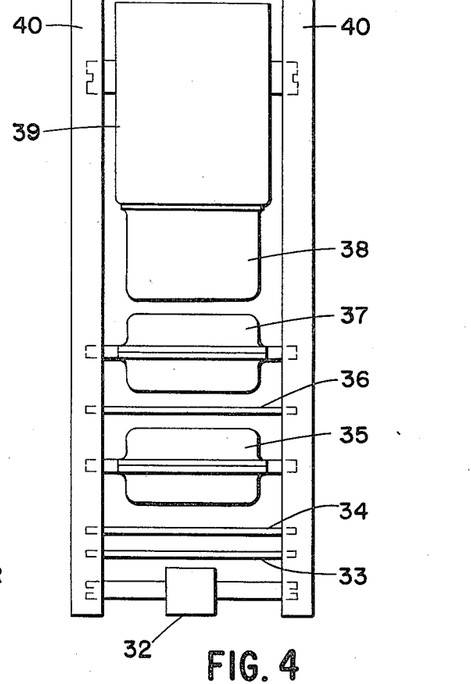
FIG. 4 is a side view of the electron gun shown in FIG. 3 taken on the line IV—IV of FIG. 3.

Electron gun 27, shown in FIGS. 3 and 4 in greater detail, is an in-line-type electron gun. Electron gun 27 generates three electron beams $18_R$, $18_G$, and $18_B$ along respective beam paths. Phospor dots or strips corresponding to red, green and blue colors are deposited on panel 22; each of three electron beams $18_R$, $18_G$, $18_B$ excite corresponding phosphors to emit lights of red, green and blue, respectively. These electron beams must converge for proper color purity.

The electron gun 27 comprises three cathodes 32 having heaters 31 for emitting the electron beams $18_R$, $18_G$, $18_B$ along initially-parallel beam paths. A plurality of grid electrodes 33, 34, 35, 36, 37 and 38 are arranged along a general common direction (i.e., downstream from cathodes 32). Namely, electrode 33 is positioned nearest cathode 32. Grid electrode 35 is positioned along the general common direction downstream from grid electrode 33. Grid electrode 34 is positioned between grid electrode 33 and grid electrode 35. Grid electrode 36 is positioned along the general common axis downstream from the grid electrode 35. Grid electrode 38 is positioned along the general common axis downstream from grid electrode 36. Grid electrode 37 is positioned between grid electrode 36 and grid electrode 38.

Each of the grid electrodes comprises a plate-like grid having three apertures therethrough in a line including two side apertures and a center aperture. Grid electrodes 33, 34 and 36 are disc-shaped members. Grid electrode 35 comprises first and second cup-shaped members 351 and 352 joined together at their open ends. Grid electrode 37 also comprises first and second cup-shaped members 371 and 372. Grid electrode 38 is cup-shaped and connects at its open end with a shield cup member 39. Cathodes 32 and the grid electrodes 33 through 38 are rigidly secured by two glass insulated supporting rods 40. Three parallel electron gun axes $Z_B$, $Z_G$, and $Z_R$ corresponding to cathodes $32_B$, $32_G$, and $32_R$, respectively, are formed equidistant from each other and extending along the general common direction. Each of the three grid apertures is disposed along a respective electron gun axis.

Side apertures $36_B$ and $36_R$ of grid electrode 36 are aligned with side gun axis $Z_B$ and $Z_R$, respectively; center aperture $36_G$ is aligned with the center electron gun axis $Z_G$. Likewise, the center aperture of each of the remaining grid electrodes are aligned with center gun axis $Z_G$. In the embodiment of FIG. 3, except for side apertures $371_B$ and $371_R$ of grid electrode 371, the side apertures $372_B$ and $372_R$ of grid electrode 372 and the side apertures $38_B$ and $38_R$ of grid electrode 38, the side apertures of all the grid electrodes are aligned with their corresponding electron gun axes $Z_B$ and $Z_R$. Apertures $371_B$, $371_R$, $372_B$, and $372_R$ are offset slightly outwardly from the side electron gun axes $Z_B$ and $Z_R$. These apertures have common relative axes $Z_{B1}$ and $Z_{R1}$ respectively. The apertures $38_B$ and $38_R$ are still more offset outwardly from the side electron gun axes $Z_{B1}$ and $Z_{R1}$ and have relative axes $Z_{B2}$ and $Z_{R2}$.

The voltages applied to the electrodes are supplied through stem pins and an anode button (not shown) on envelope 21. In operating electron gun 27 as grid drive modulation, the potential of cathode 32 is zero, the potential of grid electrode 33 is a low negative voltage, the potential of grid electrodes 34 and 36 is about +500 v, the potential of grid electrodes 35 and 37 is about +7 Kv, and the potential of grid electrode 38 is about +25 Kv. Grid electrodes 34 and 36 are interconnected with an inner lead 41, and grid electrodes 35 and 37 are interconnected with another inner lead 42. Blocks 43 through 46 as shown in FIG. 3 designate the voltage sources. Block 45 includes a variable voltage source which supplied a variable focus control voltage to adjust the focusing. In such a voltage arrangement, a first set of three electrostatic lenses (submain lenses) is formed between the grid electrode 35 and the grid electrode 37. Further, a second set of three electrostatic lenses (main lenses) is formed between the grid electrode 37 and grid electrode 38.

Each of three electron gun units is positioned along one of the respective parallel electron gun axis $Z_B$, $Z_G$ or $Z_R$. Three electron beams $18_R$, $18_G$ and $18_B$ emitted from cathodes $32_B$, $32_G$ and $32_R$ advance along electron gun axes $Z_B$, $Z_G$ and $Z_R$, respectively, passing through the apertures of grid electrodes 33 to 36. Thereafter, the center electron beam $18_G$ passes through the electrostatic sub-main lens formed by electrodes 35, 36, and 37 along electron gun axis $Z_G$. This electrostatic sub-main lens formed on electron gun axis $Z_G$ is a symmetric lens since aperture $317_G$ is aligned with axis $Z_G$; consequently, no deflection is experienced by the center beam. However, the sub-main lens found by electrodes 33 to 36 on the electron gun axes $Z_B$ and $Z_R$ are asymmetric since the centers $Z_{B1}$, $Z_{R1}$ of each of the side aperture $371_B$ and $371_R$ of grid electrode member 371 is offset from the side electron gun axes $Z_B$ and $Z_R$, respectively. As a result, the two side electron beams $18_R$ and $18_G$ are deflected inwardly to promote convergence. The deflection angle is proportional to both the potentional ratio electrostatic lens and the the amount of offset (as explained above regarding equation (1)). Thereafter, side electron beam $18_B$ passes through the electrostatic main lens formed between apertures $372_B$ and $38_B$, and the other side beam 18R passes through the electrostatic main lens formed between apertures $372_R$ and $38_R$. These main lenses formed by electrodes 37 and 38 on electron gun axes $Z_B$ and $Z_R$ are asymmetric since the centers $Z_{B2}$, $Z_{R2}$ of each of the side apertures $38_B$ and $38_R$ of grid electrode 38 are offset from the electron gun axes $Z_B$ and $Z_R$, respectively. Consequently, the two side electron beams $18_B$ and $18_R$ are further deflected to achieve convergence. On the other hand, the electrostatic main lens on electron gun axis $Z_G$ is symmetric since aperture $38_G$ is aligned with center gun axis $Z_G$. Consequently, center electron beam $18_G$ experiences no deflection and continues to follow a straight path to a center point on screen 23. The deflection of side electron beams $18_B$ and $18_R$ by the sub-main lenses and main lenses direct these beams to the center point for convergence with center electron beam $18_G$.

The operation of the first (i.e., sub-main) and second (i.e., main) electrostatic asymmetric lenses for focusing and deflecting the electron beam is controlled by the amount of offset and, the potential difference between the grid electrodes. Therefore, by applying the voltage values described above, the deflection of the electron beam by the first asymmetric lens may be less than that caused by the second asymmetric lens. However, as previously discussed regarding the prior art, if the focus voltage is varied (e.g., source 45) to control focusing, convergence will be adversely affected; consequently, other time consuming readjustments must be made to reestablish convergence. The invention, as embodied in FIG. 3, permits focus control without adversely effecting the established convergence. That is, the differential change in deflection caused by varying the focus voltage of the first asymmetric lens is effectively compensated by the accompanying differential change in deflection of the second asymmetric lens. Accordingly, focusing can be readjusted without adversely effecting convergence.

As a result, when the voltage of grid electrode 37 is reduced, and beam deflection of the first asymmetric lens reduces while the beam deflection of the second electrostatic asymmetric lens increases. The amount of decrease in deflection caused by the first asymmetric lens will substantially equal the amount of increase in deflection caused by the second asymmetric lens. Likewise, when the voltage of grid electrode 37 is increased, the beam deflection of the first electrostatic asymmetric lens increases, while the beam deflection of the second electrostatic asymmetric lens reduces. The amount of increase in deflection caused by the first asymmetric lens will substantially equal the amount of decrease in deflection caused by the second asymmetric lens. The overall effect of the invention is that the established convergence is virtually maintained, even though the focus voltage is changed. Therefore, grid electrode 37 of the electron gun structure of the invention has a larger tolerance for variations in the supplied focus voltage than the conventional type gun structure as shown in FIG. 1. Consequently, beam convergence can be adjusted during the final manufacturing process of the color cathode ray tube before the tube is attached to a TV set, without the need to readjust beam convergence after being attached to the TV set.

Figure 5A:
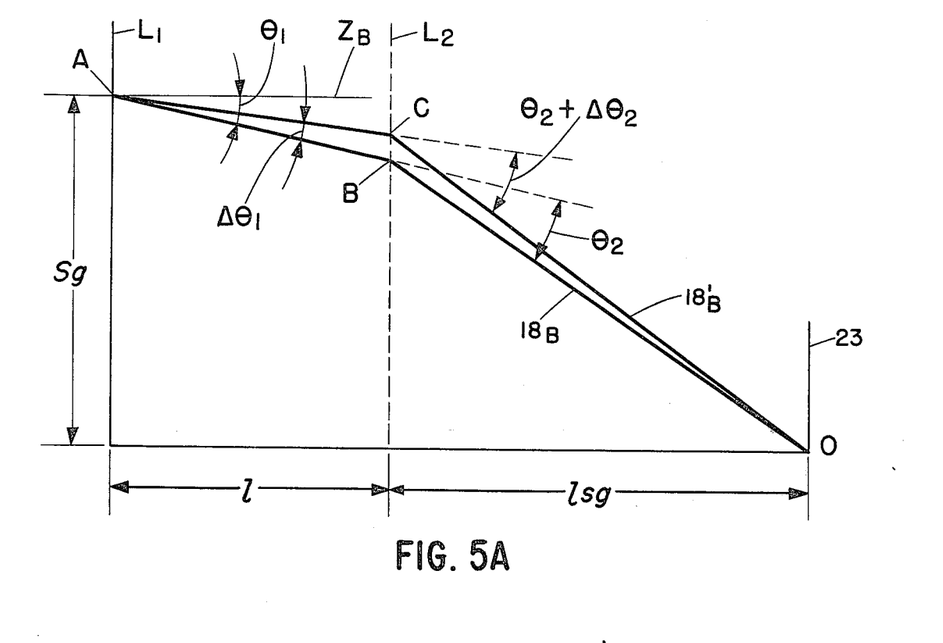
FIG. 5A is a graph for showing the operation of the electron gun in accordance with this invention.
Figure 5B:
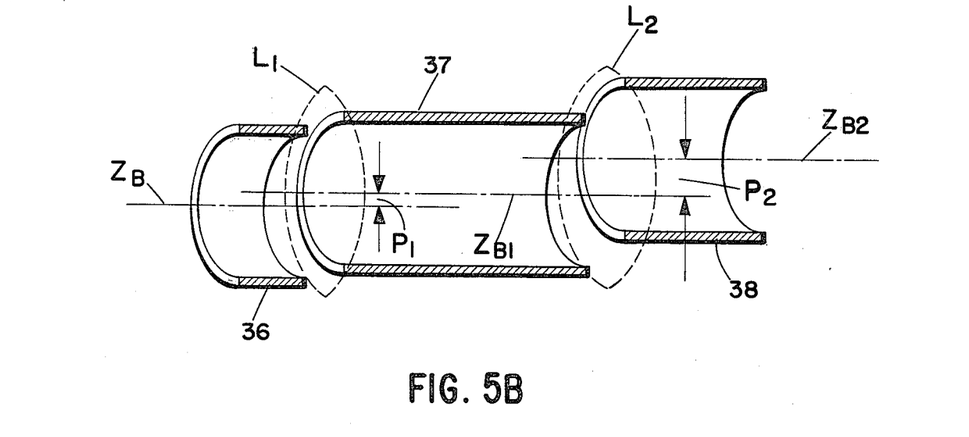
FIG. 5B is a schematic illustration of an electrode arrangement corresponding to the FIG. 5A.

FIGS. 5A and 5B illustrate the considerations in designing an electron gun of this invention. For simplicity, a single beam electron gun is represented schematically (i.e., side electron beam $18_B$) in FIG. 5A and in FIG. 5B, in more detail. The first asymmetric electrostatic lens $L_1$ is formed by grid electrodes 36 and 37 and the second asymmetric electrostatic lens $L_2$ is formed by grid electrodes 37 and 38. Line $18_B$ represents the path of a side electron beam in which convergence has been established, while line $18_B$ shows the electron beam path after the focus voltage has been decreased. The center point of the screen 23 is shown as O. With convergence established and the voltage supplied to grid electrode 37, the electron beam will initially travel along electron gun axis $Z_B$ and then pass through the A position of the first electrostatic asymmetric lens $L_1$ and the B position of the second electrostatic asymmetric lens $L_2$ along beam path $18_B$ to the position. As shown in FIG, 5A, lens $L_1$ will deflect the beam at an angle $\theta$ with the $Z_B$ axis and lens $L_2$ will further deflect the beam at an additional angle $\theta_2$. Next, when the focus voltage supplied to grid electrode 37 is reduced, the electron beam will pass through the A position of the first lens $L_1$, the C position of the second lens $L_2$, and will now pass along beam path $18_B'$ to again strike the screen 23 at the 0 position. As can be seen, lens $L_2$ has compensated for the differential deflection caused by the variation in focusing voltage. As shown in FIG. 5A, lens $L_1$ will now deflect the beam by a lesser amount $(\theta_1 - \Delta\theta_1)$; that is, the reduction in focus voltage has reduced the deflection of lens $L_1$ by $\Delta\theta_1$ (i.e., differential deflection). Lens $L_2$, on the other hand, will now deflect the beam by a greater amount $(\theta_2 + \Delta\theta_2)$; that is, the reduction in focus voltage has increased the deflection of lens $L_2$ by $\Delta\theta_2$ (i.e., differential deflection). In fact, from an examination of FIG. 5A, it can clearly be seen that over all deflection is invarried against the voltage deviation.

In other words, tolerance is obtained for grid electrode 37 as compared with the conventional type electron gun against voltage deviations. For obtaining such a tolerance, the distance $S_g$ between adjacent gun axes can be expressed from the following equations:

$$S_g = \theta_1 1 + (\theta_1 + \theta_2) 1_{Sg} \quad (2)$$

$$S_g = (\theta_1 + \Delta O_1) 1 + (\theta_1 + \theta_2 - \Delta\theta_1 + \Delta\theta_2) 1_{Sg} \quad (3)$$

where each of angles $\theta_1$ and $\theta_2$ is a deflection angle of electron beam $18_B$ (as described above), each of angles $\Delta\theta_1$ and $\Delta\theta_2$ is the differential deflection (as described above) caused by reducing the focus voltage, 1 is a distance between the first electrostatic asymmetric lens $L_1$ and the second electrostatic asymmetric lens $L_2$, and $1_{Sg}$ is a distance between the second electrostatic asymmetric lens $L_2$ and the screen 23.

In FIG. 5B, $Z_B$ is an electron gun axis upon which the aperture of grid 36 is aligned. $Z_{B1}$ is the center of the aperture of grid electrode 37, and $Z_{B2}$ is the center of the aperture of grid electrode 38. $P_1$ is the amount of offset of $Z_{B1}$ from $Z_B$ and $P_2$ is the amount of offset of $Z_{B2}$ from $Z_{B1}$. The offset can be calculated from equations (2) and (3) and the aforementioned equation (1) and the electron optical characteristics of the electrostatic lenses. Moreover, the calculated offset values can be confirmed experimentally. For example, in a 19 inch type 900° deflection color cathode ray tube having a 5.5 mm diameter electron gun, the amount of offset of the first electrostatic asymmetric lens is from about 30 μm to about 50 μm and the amount of offset of the second electrostatic asymmetric lens is about 150 μm.

Figure 6:
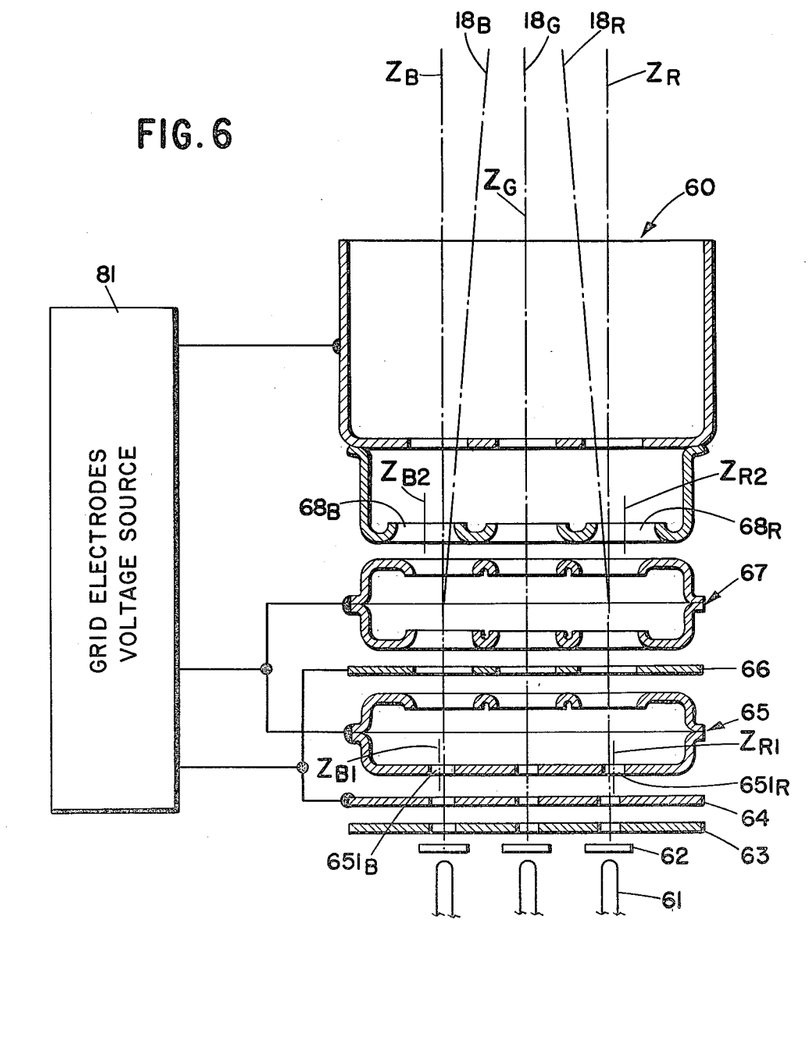
FIG. 6 is an enlarged axial sectional view of another embodiment of this invention.

FIG. 6, illustrates another embodiment of this invention. An electron gun structure 60 comprises three cathodes 62 having heater elements 61, emit electron beams $18_B$, $18_G$, and $18_R$ along three electron gun axes $Z_B$, $Z_G$ and $Z_R$, respectively. Plate-like grid electrodes 63 through 68 are disposed downstream from the cathodes 62. Each of the grid electrodes has three apertures in a line, through which electron beams $18_B$, $18_G$ and $18_R$ pass. Each of electron gun units are aligned along respective parallel electron gun axes $Z_B$, $Z_G$ and $Z_B$. Each of the grid electrodes are common to all of the electron gun units.

Grid electrode 63, grid electrode 64 and grid electrode 66, each comprises a disk-shaped member. Grid electrode 65 and grid electrode 67, each comprise two cup-shaped members, respectively joined together at their open ends. Grid electrode 68 comprises a single cup-shaped member. All of the apertures of the grid electrodes are aligned with their respective electron gun axis except the side apertures $651_B$ and $651_R$ of grid electrode 65 and the side apertures $68_B$ and $68_R$ of grid electrode 68.

The centers $Z_{B1}$ and $Z_{R1}$ of side apertures $651_B$ and $651_R$ of grid electrode 65 are offset outwardly from electron gun axes $Z_B$ and $Z_R$, respectively. As a result, the first electrostatic asymmetric lenses are formed by the apertures $651_B$ and $651_R$, respectively, between grid electrode 64 and grid electrode 65. Each of the electron beams $18_B$ and $18_R$ passing through its respective first asymmetric lens is deflected inwardly toward the center gun axis $Z_G$.

The centers $Z_{B2}$ and $Z_{R2}$ of side apertures $68_B$ and $68_R$ of grid electrode 68 are also offset outwardly from the electron gun axes $Z_B$ and $Z_R$, respectively. As a result, second asymmetric electrostatic lenses are formed by the apertures $68_B$ and $68_R$ between grid electrode 67 and grid electrode 68. Consequently, side electron beams $18_B$ and $18_R$ are further deflected inwardly by these second asymmetric lenses, toward the center electron beam $18_G$. The electrodes are connected to a voltage source 81. For example, grid electrode 68 is supplied with a 25 KV volt. Grid electrodes 65 and 67 are supplied at about 20% to about 40% of the voltage of grid electrode 68 (i.e., 7 KV). Grid electrodes 64 and 66 are supplied at about 500 V. Grid electrode 63 is supplied with a low negative voltage. As described above regarding FIG. 3, the voltage of grid electrodes 65 and 67 is altered to control beam focusing. The first and the second asymmetric lenses will compensate for the differential beam deflection of each other; consequently, convergence is virtually maintained.

Figure 7:
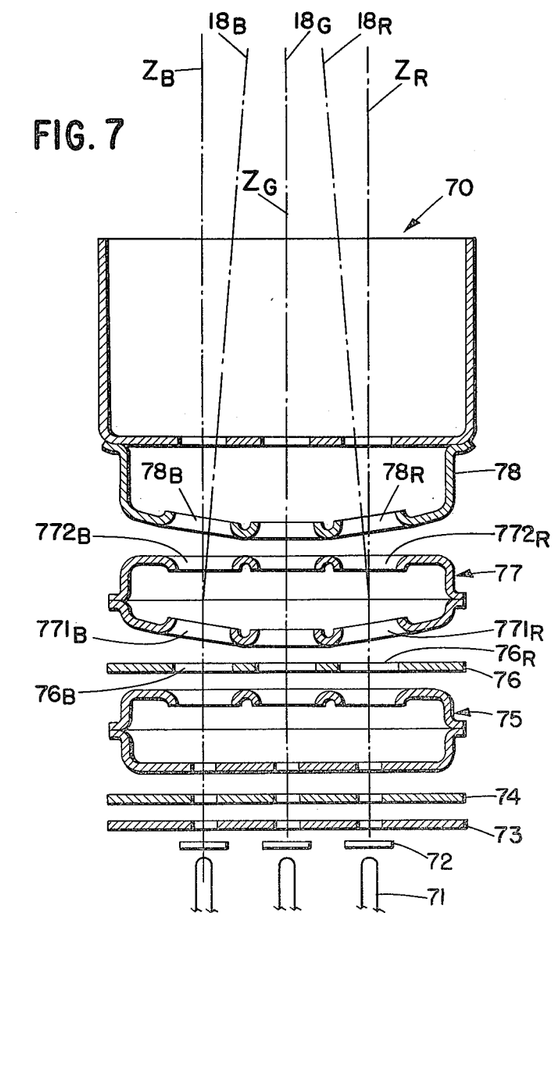
FIG. 7 is an enlarged axial sectional view of still another embodiment of this invention.

FIG. 7 shows still another embodiment of the invention. Shown is an electron gun structure 70, which is similar to the embodiments mentioned above, comprising: three cathodes 72 arranged on electron gun axes $Z_B$, $Z_G$ and $Z_R$, respectively; heater elements 71 placed within the cathodes; and grid electrodes 73 through 78. Each of the grid electrodes 73 through 78 has apertures arranged in a line which receive a respective electron beam $18_B$, $18_G$ and $18_R$. Each aperture defines a plane. The plane of all the apertures are aligned perpendicular to respective electron gun axes $Z_B$, $Z_G$, and $Z_R$, except for side apertures $771_B$ and $771_R$ of grid electrode 77 and side apertures $78_B$ and $78_R$ of grid electrode 78. Namely, the plane of apertures $771_B$ and $771_R$ are disposed at an angle with respect to the plane of the apertures $76_B$ and $76_R$ of grid electrode 76, and the plane of apertures $78_B$ and $78_R$ are disposed at an angle with respect to the plane of the apertures $772_B$ and $772_R$ of grid electrode 77. As a result, the first electrostatic lenses formed between apertures $771_B$, $771_R$ and apertures $76_B$ and $76_R$, respectively, are asymmetric. Also, the second electrostatic lenses formed between apertures $78_B$, $78_R$ and apertures $772_B$ and $772_R$, respectively, are asymmetric. Consequently, side electron beams $18_B$ and $18_R$ are deflected toward the center gun axis $Z_G$ by these asymmetric lenses. The three beams are converged to the center position on the screen. As discussed previously regarding the other embodiments, this established convergence is maintained in spite of voltage deviation of grid electrode 77 during focusing; the two asymmetric lenses on a common electron gun axis compensate for the differential beam deflection due to voltage deviation.

It is understood that the electron gun structure of this invention can be provided with both asymmetric lenses of the offset type and the angled type of FIG. 7.

It is also understood that this invention can be used in many types of electron guns, i.e., bi-potential focus, uni-potential focus, periodic potential focus, and tri-potential focus. Because an electron gun structure has generally a plurality of electrostatic lenses on an electron gun axis, even an electron gun having a single main electrostatic lens such as the bi-potential focus type can obtain the effects of this invention with an asymmetric lens field between grid electrodes 4 and 5 (see FIG. 1, for example).

According to this invention, the number of asymmetric lenses on an electron gun axis are not limited only to two; more than two asymmetric lenses can be utilized on an axis. Asymmetric lenses can also be employed whereby one asymmetric lens deflects the beam in a first direction and a second asymmetric lens deflects the beam in an opposite direction.

It is further understood that this invention can be applied to a delta type electron gun in lieu of an in-line type gun.

We claim:

1. An electron gun system comprising:
   a cathode means, positioned on an electron gun axis, for emitting an electron beam along a beam path;
   a plurality of grid electrodes arranged along said electron gun axis, a first voltage source coupled to at least one of said grid electrodes for forming a plurality of electrostatic lenses on said electron gun axis for focusing said electron beam;
   a focus control means coupled to a first voltage source for controlling said focusing; and
   wherein at least three of said grid electrodes comprise asymmetric deflecting means for forming at least two asymmetric electrostatic lenses along said electron gun axis for deflecting said electron beam.

2. The electron gun structure of claim 1 wherein said asymmetric electrostatic lenses comprise a first asymmetric lens positioned near said cathode and a second asymmetric lens positioned along the electron gun axis downstream from said first asymmetric lens,
   wherein said first asymmetric lens, in response to said focus control means, deflects the beam at a first differential angle and said second asymmetric lens deflects the beam at a second differential angle to compensate for said first differential angle deflection caused by said first asymmetric lens.

3. The electron gun structure according to claim 1 wherein said plurality of grid electrodes comprises a first, second and third grid electrode, said second grid electrode positioned between said first and third grid electrodes and wherein said asymmetric deflecting means forms two asymmetric electrostatic lenses, one of said asymmetric lenses positioned between said first grid electrode and said second grid electrode and the other of said asymmetric lenses positioned between said second grid electrode and third grid electrode,
   said first voltage source is coupled to said second grid electrode whereby, in response to said focus control means, said other asymmetric lens compensates for a differential deflection caused by said one asymmetric lens.

4. The electron gun structure according to claim 3, further comprising a second voltage source coupled to said first grid electrode and a third voltage source coupled to said third grid electrode, wherein said first voltage source is greater than said second voltage source but lower than said third voltage source.

5. The electron gun structure according to claim 1 wherein at least one of said asymmetric electrostatic lenses comprises two spaced grid electrodes, each having an aperture, wherein the center of one aperture is offset from the center of the other aperture.

6. The electron gun structure according to claim 1 wherein at least one of said asymmetric electrostatic lenses comprises two spaced grid electrodes each having an aperture defining a plane, wherein the plane of the aperture of one electrode is disposed at an angle with respect to the plane of the aperture of the other electrode.

7. The electron gun structure according to claim 1 wherein said grid electrodes comprises a first electrode positioned near said cathode, a third electrode positioned along said electron gun axis downstream from said first electrode, a second electrode positioned between said first and third electrode, a fourth electrode positioned along said electron gun axis downstream from said third electrode, a sixth electrode positioned along said electron gun axis downstream from said fourth electrode, and a fifth positioned between said fourth and sixth electrode.

8. The electron gun structure according to claim 7 wherein said second electrode and said third electrode form a first asymmetric lens, and said fifth electrode and said sixth electrode form a second asymmetric lens.

9. An electron gun system comprising:
a cathode means comprising first, second and third cathode for emitting first, second and third initially-parallel electron beams, respectively, having a general common direction; wherein said first electrode is positioned on a first gun axis, said third electrode is positioned on a third gun axis and second electrode is positioned on a center gun axis;
a plurality of grid electrodes, each comprising a plate-like grid having three apertures therethrough in a line including two side apertures and a center aperture; and a voltage means for supplying voltages to said grid electrodes; wherein said center aperture of each of said grid electrodes is aligned with said center gun axis for forming a plurality of symmetric lenses for focusing said second beam, said one side aperture of each of said grid electrodes is disposed along said first gun axis for forming at least two asymmetric lenses for deflecting and focusing said first electron beam; and
said other side aperture of each of said grid electrodes is disposed along said second gun axis for forming at least two asymmetric lenses for deflecting and focusing said third electron beam.

* * * * *

UNITED STATES PATENT AND TRADEMARK OFFICE
CERTIFICATE OF CORRECTION

PATENT NO. : 4,334,169
DATED : June 8, 1982
INVENTOR(S) : Shigeo Takenaka et al

It is certified that error appears in the above—identified patent and that said Letters Patent is hereby corrected as shown below:

On the title page, after "[22] Filed: October 17, 1979" insert the following information:

--[30] FOREIGN APPLICATION PRIORITY DATA

October 17, 1978    Japan ........................ 126822/78--

Signed and Sealed this

Seventh Day of September 1982

[SEAL]

Attest:

GERALD J. MOSSINGHOFF

Attesting Officer    Commissioner of Patents and Trademarks